(12) United States Patent
Laing

(10) Patent No.: US 11,111,926 B2
(45) Date of Patent: Sep. 7, 2021

(54) SWITCHING OF A PUMP BASED ON THE THROUGHPUT DETERMINED BY A THERMAL FLOW METER

(71) Applicant: Xylem IP Management S.à r.l., Senningerberg (LU)

(72) Inventor: Oliver Laing, Herrenberg (DE)

(73) Assignee: Xylem IP Management S.à r.l., Senningerberg (LU)

( * ) Notice: Subject to any disclaimer, the term of this patent is extended or adjusted under 35 U.S.C. 154(b) by 109 days.

(21) Appl. No.: 15/776,562

(22) PCT Filed: Nov. 14, 2016

(86) PCT No.: PCT/EP2016/077584
§ 371 (c)(1),
(2) Date: May 16, 2018

(87) PCT Pub. No.: WO2017/085016
PCT Pub. Date: May 26, 2017

(65) Prior Publication Data
US 2018/0328366 A1 Nov. 15, 2018

(30) Foreign Application Priority Data
Nov. 17, 2015 (DE) .......................... 102015119832.0

(51) Int. Cl.
*F04D 15/02* (2006.01)
*F04D 29/58* (2006.01)

(52) U.S. Cl.
CPC ..... *F04D 15/0227* (2013.01); *F04D 15/0209* (2013.01); *F04D 29/588* (2013.01); *F05D 2270/303* (2013.01); *F05D 2270/3061* (2013.01)

(58) Field of Classification Search
CPC .......... F04D 13/027; F04D 13/06; F04D 7/06; H02K 49/106; H02K 2201/06
See application file for complete search history.

(56) References Cited

U.S. PATENT DOCUMENTS 3,680,377 A * 8/1972 Lightner ................... G01F 1/68
73/204.12
4,480,467 A * 11/1984 Harter ..................... G01F 1/684
340/606

(Continued)

FOREIGN PATENT DOCUMENTS

DE 19914581 A1 10/2000
DE 20312618 U1 10/2003

(Continued)

OTHER PUBLICATIONS

International Search Report and Written Opinion for International Application No. PCT/EP2016/077584, dated Feb. 13, 2017, 11 pages.

*Primary Examiner* — Connor J Tremarche
(74) *Attorney, Agent, or Firm* — RatnerPrestia

(57) ABSTRACT

A feed pump to increase the pressure in a line includes a pumping chamber for a pumping medium. At least one temperature sensor, which is arranged in the feed pump, is allocated to the pumping chamber and is in thermal contact with the pumping chamber for determining a temperature of the pumping medium in the pumping chamber. A temperature control device is allocated to the at least one temperature sensor and by which defined temperature conditions can be created in an area surrounding the at least one temperature sensor. An evaluation device to which the at least one temperature sensor is coupled for signal purposes uses the data from the at least one temperature sensor to determine whether pumping medium is flowing through the pumping chamber or not.

21 Claims, 5 Drawing Sheets

(56) References Cited

U.S. PATENT DOCUMENTS

| | | | |
|---|---|---|---|
| 6,048,363 A * | 4/2000 | Nagyszalanczy | A61M 1/1086 623/3.13 |
| 6,198,186 B1 * | 3/2001 | Wallace | H02K 15/125 219/201 |
| 6,273,684 B1 | 8/2001 | Jensen et al. | |
| 6,527,517 B1 | 3/2003 | Wallrafen et al. | |
| 7,044,714 B2 | 5/2006 | Bevan et al. | |
| 8,245,628 B2 | 8/2012 | Magg et al. | |
| 8,747,075 B1 | 6/2014 | Gandini | |
| 2008/0044168 A1 * | 2/2008 | Eichholz | F04D 29/588 392/471 |
| 2009/0121034 A1 | 5/2009 | Laing et al. | |
| 2009/0126100 A1 * | 5/2009 | Kenoyer | F24H 1/0081 4/559 |
| 2013/0249340 A1 * | 9/2013 | Potoradi | H02K 21/02 310/156.01 |
| 2014/0239940 A1 * | 8/2014 | Meltzer | G01R 21/02 324/95 |

FOREIGN PATENT DOCUMENTS

| | | | | |
|---|---|---|---|---|
| DE | 102007054313 A1 | 5/2009 | | |
| EP | 1241357 A1 * | 9/2002 | | F04D 15/0209 |
| EP | 1241357 A1 | 9/2002 | | |
| EP | 1496340 A1 | 1/2005 | | |

\* cited by examiner

SWITCHING OF A PUMP BASED ON THE THROUGHPUT DETERMINED BY A THERMAL FLOW METER

CROSS-REFERENCE TO RELATED APPLICATIONS

This patent application is a U.S. National Phase Patent Application of PCT Application No.: PCT/EP2016/077584, filed Nov. 14, 2016, which claims priority to German Patent Application No. 10 2015 119 832.0, filed Nov. 17, 2015, each of which is incorporated by reference herein in its entirety.

FIELD OF THE INVENTION

The invention relates to a feed pump to increase the pressure in a line.

The invention further relates to a method for operating a feed pump which is connected to a line.

BACKGROUND OF THE INVENTION

A centrifugal pump unit with a flow monitor arranged inside a pump housing in the flow path of the pumping medium is known from DE 199 14 581 A1. This consists of an electromagnetic switching device and a two-arm, rotatably mounted lever, one arm of which protrudes into the flow path and the other arm of which has a magnet that is operatively connected to the switching device in a contactless manner, wherein the switching device is arranged inside a terminal box arranged on the unit housing. The part of the lever that bears the magnet is surrounded by a monitor housing that is hermetically sealed in an outwards direction and is separate from the terminal box and arranged adjacent to said terminal box.

A controller for the control/regulation of a pump unit of an oil source is known from U.S. Pat. No. 7,044,714 B2.

A pump for a cooling circuit of a combustion engine is known from U.S. Pat. No. 6,527,517 B1.

A steam cleaning device is known from DE 203 12 618 U1.

A device for monitoring fluid levels is known from U.S. Pat. No. 8,747,075 B1.

A coffee machine is known from U.S. Pat. No. 8,245,628 B2.

The object of the invention is to provide a feed pump of the type mentioned at the outset which comprises a flow monitor with a simple construction.

SUMMARY OF THE INVENTION

This object is achieved according to the invention in the feed pump mentioned in the outset in that a pumping chamber is provided for pumping medium, which pumping chamber has at least one temperature sensor which is arranged in the feed pump, is allocated to the pumping chamber, is in thermal contact with the pumping chamber and by means of which a temperature can be determined for a pumping medium in the pumping chamber; a temperature control device being provided which is allocated to the at least one temperature sensor and by means of which defined temperature conditions can be created in the area surrounding the at least one temperature; and by an evaluation device being provided to which the at least one temperature sensor is coupled for signal purposes and which uses the data from the at least one temperature sensor to determine whether pumping medium is flowing through the pumping chamber or not.

It can be sensible for the pressure in a line to be increased in a water system such as an industrial water system (drinking water system). For example, if insufficient pressure is available for a waterworks.

If for example a heating device is provided to heat industrial water, it is often the case that the heating device can only be sensibly operated if a certain minimum pressure is reached.

According to the invention, a feed pump is provided which can use the evaluation device to determine whether there is pumping medium flowing through the pumping chamber or not by means of the at least one integrated temperature sensor. The flow of pumping medium through the pumping chamber (between an inlet of the pumping chamber and an outlet of the pumping chamber) corresponds to the flow through the line in which an increase in pressure is to take place or in the event that there is no through flow the pumping chamber there is no flow in the line (provided blockages of the feed pump and the like can be ruled out).

It has been demonstrated that in the event of a corresponding evaluation of temperature signals of the at least one temperature sensor, corresponding information can be obtained that characterises the flow.

This information can be obtained with the "on-board means" of the feed pump. In particular, no additional mechanical elements are needed that for example could obstruct the flow for a flow monitor to be created. A constructive modification of the feed pump to obtain the additional information is minimal.

By evaluating the corresponding data provided by the at least one temperature sensor, the evaluation device is able to determine whether there is a flow or not. These data can in turn be used to determine whether the feed pump can be switched off or needs to be switched back on. This results in optimised energy-saving operation; the feed pump only runs when this is necessary. The evaluation device with the at least one temperature sensor forms a flow monitor.

If for example a valve is opened in an industrial water system (drinking water system) (for example a shower being switched on), then pumping medium (water) flows in the corresponding line. The feed pump can recognise this and can also "switch itself on" for pump operation using the evaluation device. When the valve is closed again, the feed pump can recognise this too and, as it were, "switch itself back off".

The solution according to the invention allows sufficient pressure to be generated for the operation of a heating device arranged in the same thread as the feed pump.

A temperature control device is provided which is allocated to the at least one temperature sensor and by means of which defined temperature conditions can be created in the area surrounding the at least one temperature sensor. If there is no flow, the adjustment of the temperature enables the temperature in the area surrounding the at least one temperature sensor to be increased to a temperature that is above the temperature of the pumping medium; this means the start of flow can easily be identified.

The feed pump has a certain and fundamentally known thermal mass and a fundamentally known power consumption at a zero throughput of pumping medium. The temperature in the area surrounding the at least one temperature sensor is higher than the temperature of the pumping medium flowing through it when there is no flow. If there is a lack of flow, the temperature control device can increase the temperature on the at least one temperature sensor to such an extent that the evaluation device can determine the flow from the cooling of the at least one temperature sensor.

The known thermal mass of the feed pump and the known power consumption at zero throughput results in a (certain) increase in the temperature that is a reliable signal of the absence of flow, wherein there can be a certain tolerance and monitoring over a certain period for example the magnitude of a minute is provided for. Changes in temperature with another increase are indicators of flow.

A feed pump according to the invention can in particular be used if an infrastructure is not able to provide sufficient water pressure (pressure of the pumping medium).

It is also possible for the main water line in a house not to be sufficiently well insulated and for the industrial water to be heated up by the rays of the sun. This leads, for example, to an initial considerable increase in temperature when showering followed by cold industrial water entering the feed pump.

When the feed pump is not running, this is a valid indicator (and in particular the only valid indicator) that when there is a flow a temperature curve deviates from a constant, slightly decreasing or in the event of an elevated ambient temperature slightly increasing value. There is generally a decrease in temperature when a temperature control device is operating.

The solution according to the invention can be used to designate each temperature change that cannot be explained by convective or conductive cooling or heating as flow.

In particular, housing is provided in which the pumping chamber is arranged, wherein the at least one temperature sensor is arranged inside the housing. The at least one temperature sensor is therefore integrated into the feed pump. A pumping part and a motor part for the feed pump are arranged in the housing. It is in principle possible for the housing to have a pump housing part and a motor housing part, which in particular are separate from one another (and connected to one another). A temperature sensor can be arranged in the pump housing part and/or in the motor housing part.

It is particularly advantageous if the evaluation device can emit activation signals to activate pump operation and deactivation signals to deactivate pump operation. This means that the feed pump can switch itself on and off as needed.

In particular, a motor (and in particular an electric motor) is provided to drive an impeller, wherein in an embodiment the at least one temperature sensor is arranged on a motor housing. The temperature of pumping medium in the pumping chamber can be determined when the equipment is arranged accordingly. The arrangement of the at least one temperature sensor on (and in particular in) the motor housing and in the motor means cable connections can be optimised and where necessary even avoided. This can in particular ensure that the motor and the pump housing can be disassembled.

Alternatively or additionally, there can be provisions for the at least one temperature sensor to be arranged on or proximal to the wall of the pumping chamber. The temperature of pumping medium in the pumping chamber can be easily detected in this way.

In an embodiment the at least one temperature sensor comprises a temperature control device, wherein in particular the temperature control device is integrated into the at least one temperature sensor. The at least one temperature sensor comprises, for example a resistance element such as an NTC element (thermistor) or is formed from a resistance element of this type which is itself used for temperature control. If for example a test voltage is placed on an NTC element, a temperature can be determined. If higher voltages are applied, the NTC element is used as a heating element.

It is for example also possible for the temperature device to be formed from at least one heating element and in particular resistance element or to comprise at least one heating element which is in particular separate from the at least one temperature sensor. Defined temperature conditions can be set in this way.

It is also possible to provide for the temperature control device to be formed by one or more coils of a motor of the feed pump or to comprise one or more coils of the motor, wherein there is a heat conduction connection between the coil(s) and the area surrounding the at least one temperature sensor. In particular, a heating of a motor (and in particular an electric motor) of the feed pump can be used to control the temperature in the area surrounding the at least one temperature sensor. For example, a motor housing can create the heat conduction connection itself; motor housings made of aluminium provide good heat conduction.

It is for example also possible for the evaluation device to comprise a temperature control member which ensures the operation of the feed pump without the flow of pumping medium for a specific duration of time in order to create defined temperature conditions in the area surrounding the at least one temperature sensor. For example, if there is no flow the feed pump can be operated for long enough for the temperature in the area surrounding the at least one temperature sensor to reach a desired value by heating the feed pump.

It is particularly advantageous for the evaluation device to evaluate the development of the temperatures determined over time. The progression of the temperatures determined over time can be used to detect whether there is a flow through the pumping chamber (and therefore the line) or not. A "non-mechanical" flow monitor can be created as a result.

In particular, the evaluation device provides at least one of the following options for detection: throughflow of pumping medium, lack of throughflow of pumping medium.

The corresponding detection results can be used to activate the pump activity of the feed pump (if a flow of pumping medium is identified) or to deactivate this (if a lack of throughflow of pumping medium is identified). This means unnecessary pump running time can be avoided and energy-saving operation is possible.

In particular, a lack of pumping medium is detected or can be detected accordingly from an increase in temperature over time at in particular an at least approximately linear increase in temperature over time. When the feed pump is activated, in other words when the pump is operating, a valve on the corresponding line is closed such that no further flow can occur. This results in the development of heat which leads to the heating of the pumping medium in the pumping chamber. This heating is solely determined by pump parameters which determine the thermal mass of the feed pump and the power consumption in the event of zero throughput. This development of heat is not variable. The increase in temperature over time is in particular at least approximatively linear over time. This increase in temperature can be detected and is a corresponding indication of a lack of flow.

Flow of pumping medium after a phase without flow can be detected and is detected accordingly by means of a change in temperature over time and in particular by means of a reduction in temperature over time. A flow of this type after a phase without flow is for example created by opening a valve (on the line). The corresponding reduction in temperature over time can be detected by the evaluation device using the data provided by the at least one temperature sensor and the corresponding conclusions can automatically be drawn by the evaluation device. A flow of pumping medium after a phase without flow can generally be detected from a change in temperature that deviates considerably from a very slow change in temperature.

In particular, if a lack of flow is determined the evaluation device generates a deactivation signal for the operation of the feed pump. This avoids unnecessary pump running time.

The deactivation signal can in particular be generated immediately after the detection of a lack of flow, or the deactivation signal is generated when a specific temperature threshold is reached. The specific temperature threshold is for example determined directly by means of the at least one temperature sensor, or it is calculated over time.

It is furthermore favourable if, on detection of a flow following a phase of a lack of flow, the evaluation device generates an activation signal for the operation of the feed pump. This results in pump operation when the need for pump operation is identified, because in particular a valve has been opened.

According to the invention, a method for the operation of a feed pump according to the invention is provided, which is connected to a line in which the evaluation device uses the development of temperature signals provided by the at least one temperature sensor inside the feed pump over time to detect whether there is flow in the line or not.

The advantages of the method according to the invention have already been explained in connection with the feed pump according to the invention.

The feed pump itself can be used to determine whether there is a flow in the line in which the pressure is to be elevated or not without mechanical means. This makes it possible for the pump to switch itself on or off as required.

In particular, the evaluation device provides activation signals for the activation of operation of the feed pump and deactivation signals for the deactivation of the operation of the pump. This means the feed pump can be operated in a manner optimally adjusted to the flow conditions of the line. Whether or not there is a flow on the line is outside of the sphere of influence of the pump. If a valve is opened on the line, for example, this results in a flow. If the valve on the line is closed, the flow is blocked. Flow on the line also causes flow in the pumping chamber of the feed pump. Blocking the flow in the line means that the pumping medium no longer flows through the pumping chamber of the feed pump. The evaluation device of the feed pump can detect the flow or lack of flow on the line by evaluating the temperature signals generated by the at least one temperature sensor.

In particular, an activation signal is generated for the feed pump when it is deactivated if flow through the line is detected. The feed pump can switch itself on in this way.

For the same reason, it is advantageous, if the evaluation device generates a deactivation signal for the feed pump when the feed pump is activated if a lack of flow in the line is detected. The feed pump can switch itself off in this way.

In particular, if the area surrounding the at least one temperature sensor is heated by a temperature control device, a flow on the line is detected from the reduction in temperature over time measured on the feed pump. In this way, a flow on the line can be detected solely by carrying out measurements inside the feed pump. No mechanical sensors or the like need to be provided. The flow itself is not obstructed by the measurement. It is also fundamentally possible for the temperature to initially increase when the flow starts if the industrial water is heated by external influences or a lack of insulation before it reaches the feed pump. A change in temperature of this kind also means that a flow is occurring.

Accordingly, it is favourable if a lack of flow in the line is detected from a temperature increase over time and in particular one that is at least approximatively linear over time, measured in the feed pump. This increase over time is solely determined by pump parameters and in particular by the thermal mass of the feed pump and the power consumption in the event of zero throughput. It is therefore easily possible to switch off the feed pump when pump operation is not necessary.

It is possible to provide for the temperature control device to be activated if the temperature falls below a specific temperature which is still sufficient to detect flow. This causes reheating when the feed pump is supposed to cool slowly after temperature control. This means it is fundamentally possible for the entire unit to heat up to considerably above a temperature specified by the temperature control device if it is not used if the area surrounding the feed pump is at a temperature that is significantly above the temperature of the pumping medium.

The feed pump according to the invention and the method according to the invention can advantageously be used to increase the pressure in a line of an industrial water system. In particular, the feed pump and the method are used to provide water at the temperature necessary for heating operation around a heating device.

BRIEF DESCRIPTION OF THE DRAWING FIGURES

The description of preferred embodiments below aims to describe the invention in greater detail in combination with the drawings. In the drawings.

DETAILED DESCRIPTION OF THE INVENTION

Figure 1:
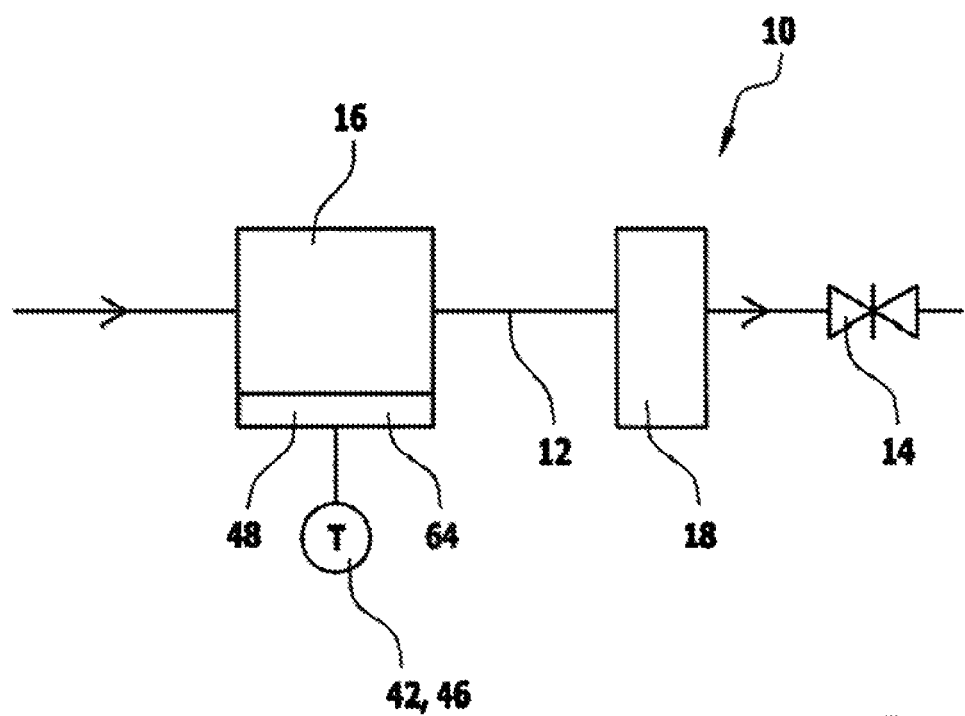
FIG. 1 shows a schematic representation of an arrangement of a feed pump on a line with a valve.

An exemplary embodiment of an industrial water system which is partially shown in FIG. 1 and is designated 10 there comprises a line 12 on which a valve 14 is arranged. The valve 14 is for example arranged on a shower. If the valve 14 is open, then water flows from the shower.

A feed pump 16 is arranged on the line 12. The feed pump 16 serves to increase the pressure in the line 12, in particular if the pressure provided by a waterworks is not sufficient.

It is also possible for the industrial water system 10 to have a heating device 18 which is used to heat water that, for example, runs to a shower. It is often necessary for the water to be heated to be of a minimum pressure for the proper functioning of the heating device 18. The feed pump 16 can provide a minimum pressure of this type, including when a waterworks does not provide sufficient pressure.

An embodiment of a feed pump 16 (circulating pump) is for example known from DE 10 2007 054 313 A1 or US 2009/0121034. Reference is expressly made to the full content of these documents.

The pump 16 (FIG. 2) comprises an electric motor (20) with a stator 22 and a rotor 24.

The electric motor 20 has a motor housing 26 in which the stator 22 and the rotor 24 are arranged.

Figure 2:
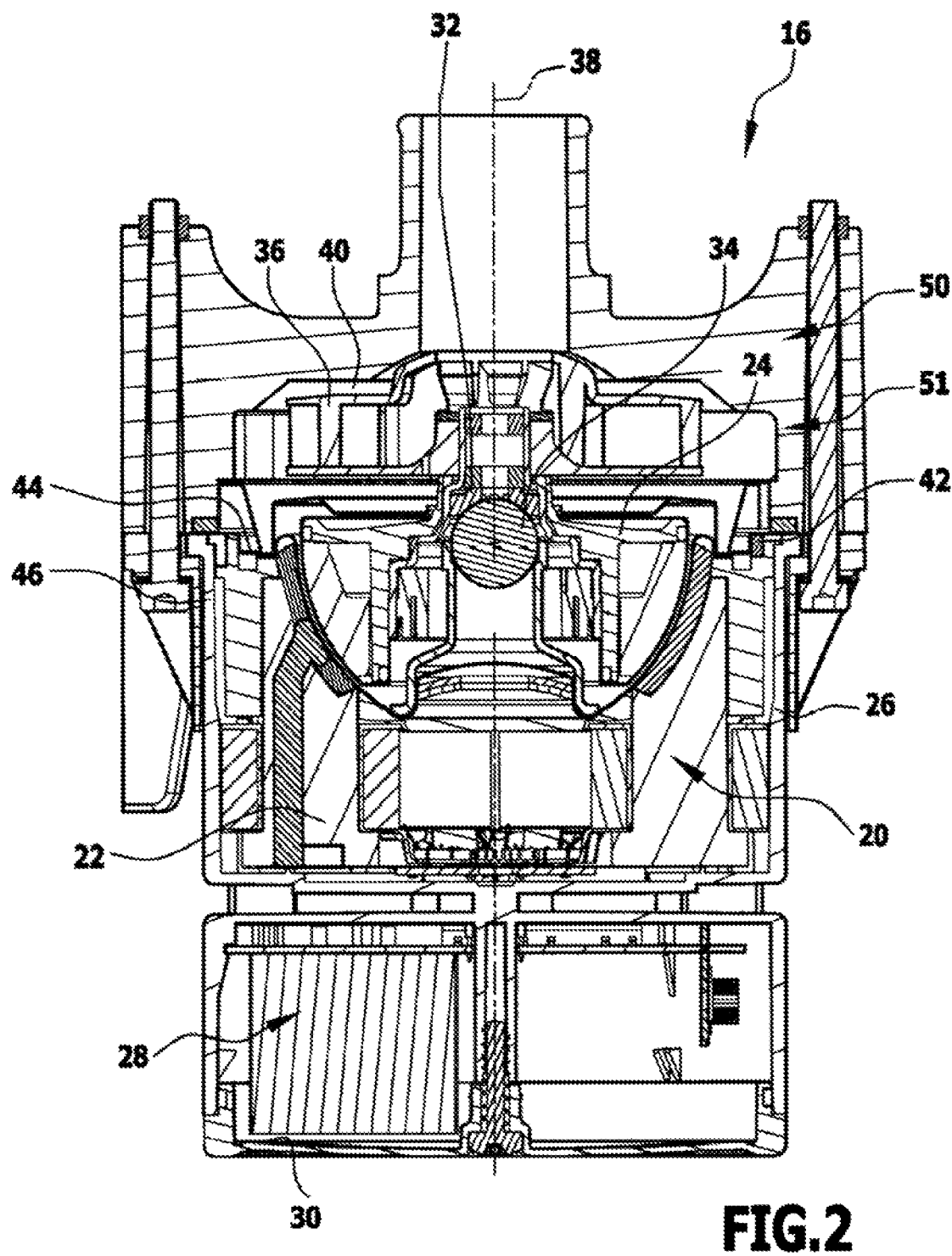
FIG. 2 shows a schematic sectional view of an embodiment of a feed pump according to the invention.

The electric motor 20 further has a motor circuit 28. The motor circuit 28 is arranged in a circuit housing 30. The circuit housing 30 can be formed separately to the motor housing 26 as shown in FIG. 2, or be formed by the motor housing 26.

The rotor 24 is mounted above a bearing shell 32 on a convex bearing body 34 which is in particular formed as a bearing ball, for example made of ceramics. A spherical bearing is formed from the bearing body 34 and the bearing shell 32.

An impeller 36 is non-rotatably connected to the rotor 24. The impeller 36 rotates about a rotational axis 38 in a pumping chamber 40. Pumping medium can flow through the pumping chamber 40, wherein the flow is driven by the impeller 36 when the pump is operating. If pumping medium is flowing through the pumping chamber 40, pumping medium is also flowing in the line 12. The pump can also be in operation (be activated) if there is no flow in the line 12 and therefore in the pumping chamber 40; if the valve 14 is closed then no pumping medium can be transported through the pumping chamber 40 and the line 12, wherein the rotor 24 is rotated using the impeller 36 when the feed pump 16 is activated.

The feed pump 16 comprises a temperature sensor 42.

The temperature sensor 42 is arranged and designed such that a temperature of pumping medium in the pumping chamber 40 can be determined using said temperature sensor.

The temperature sensor 42 is preferably outside of the pumping chamber 40 in order not to affect the flow of pumping medium.

The pumping chamber 40 is limited by a wall 44. In an exemplary embodiment the temperature sensor 42 is on the wall 44 outside of the pumping chamber 40. It can be placed, for example, directly on an outside of the wall 44 or at a small distance from this. It is in particular in thermal contact with the wall 44.

It is preferably provided for the temperature sensor to lie on the motor housing 26 as indicated in FIG. 2 by reference number 46 and thereby to be in thermal contact with the pumping chamber 40.

The feed pump 16 has an evaluation device 48 (FIG. 1). The temperature sensor 42 or 46 provides its temperature signals to the evaluation device 48. The evaluation device 48 is for example integrated into the motor housing 28.

The feed pump 16 has a housing 50. The impeller 36 is arranged inside the housing 50. The electric motor 20 is arranged at least in part inside the housing 50. The temperature sensor 42 or 46 is arranged inside the housing 50.

In an exemplary embodiment the housing 50 has a pump housing 51 as the first part of the housing and the motor housing 26 as the second part of the housing. The motor housing 26 lies on the pump housing 51. The impeller 36 is positioned in the pump housing 51. The temperature sensor 42 lies in the housing 50 and therefore in the pump housing 51. The temperature sensor 46 lies in the motor housing 26.

It is advantageous for the temperature sensor 46 to be used for the simple disassembly of the electric motor 20 from the pump housing 51. This means that no cable connections for the temperature sensor need to run into the pump housing 51.

Taking the signals from the temperature sensor 42 or 46 as a basis, the evaluation device 48 can determine whether pumping medium is flowing through the pumping chamber 40 and therefore the line 12.

In an embodiment a temperature control device 52 is allocated to the temperature sensor (for example temperature sensor 42). The temperature control device 52 ensures that defined temperature conditions are in place in an area 54 surrounding the temperature sensor 42. This means changes in temperature over time can be allocated directly to changes in the temperature of the pumping medium in the pumping chamber 40.

In an embodiment the temperature control device 52 comprises a temperature control chamber 56. This has a housing 58, in particular made of a thermally insulating material. The temperature sensor 42 (or 46) is then arranged in the housing 58 and is in thermal contact with the pumping chamber 40. For example, it is arranged directly on the wall 44 or there is a heat conduction connection between the wall 44 and the temperature sensor 42 or 46 and the housing 58.

Figure 5:
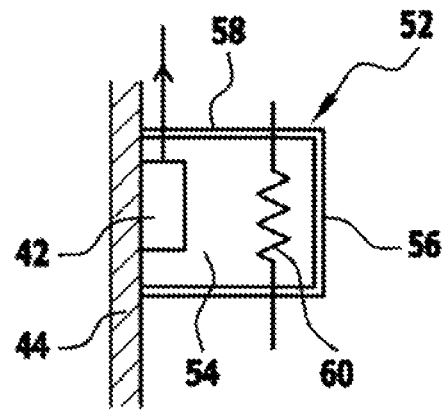
FIG. 5 shows a schematic representation of an embodiment of a temperature control device.

In an embodiment (FIG. 5) the temperature control device 52 comprises at least one heating element 60 and in particular a resistance heating element which is arranged in the temperature control chamber 56. By applying electricity to the heating element 60 in a corresponding manner, a defined temperature can be set in the temperature control chamber 56 and therefore in the area 54 surrounding the temperature sensor 42 or 46. The temperature set is selected in relation to the temperatures of the pumping medium to be expected in the line 12.

Figure 6:
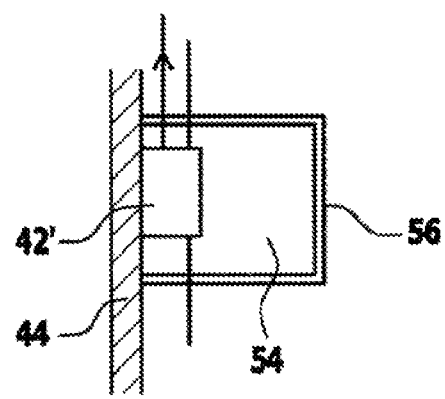
FIG. 6 shows a further exemplary embodiment of a temperature control device.

In a further embodiment, a schematic representation of which is shown in FIG. 6, a temperature sensor 42' is provided which is arranged in a temperature control chamber 56. The temperature control chamber is fundamentally designed as described above. Like reference numbers are used for like elements.

The temperature sensor 42' is designed such that a heating element is integrated into it. It is therefore part of the temperature control device 52. The temperature sensor 42' is for example designed as an NTC (thermistor), which also generates heat as a result of an electric current.

Figure 7:
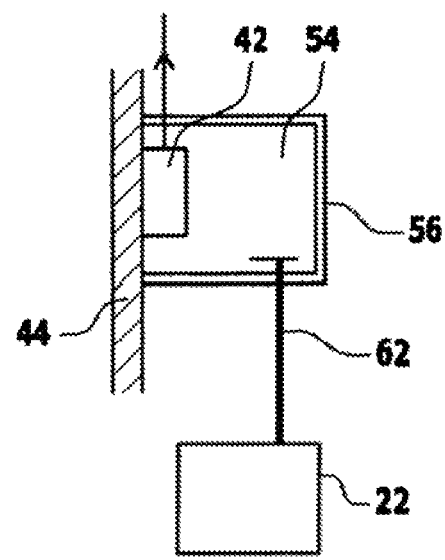
FIG. 7 shows a further exemplary embodiment of a temperature control device.

In a further embodiment (FIG. 7), a temperature control chamber is once again provided corresponding to temperature control chamber 56. The temperature sensor 42 or 46 is provided as a temperature sensor.

One or more heat conduction connections 62 lead from the one or more coils of the stator 22 of the electric motor 20 of the feed pump 16 to the temperature control chamber 56 and in particular into the temperature control chamber 56. Waste heat from one or more coils of the stator 42 can be used to achieve a defined control of the temperature of the area 54 surrounding the temperature sensor 42 or 46 in order to increase the temperature in the area surrounding the temperature sensor 42 or 46 to a temperature above the temperature of the pumping medium when there is no flow. This means the start of flow can easily be identified.

It is, for example, also possible for the evaluation device 48 to comprise a temperature control member 64. The temperature control member 64 ensures that the feed pump 16 is operated (in other words the impeller 36 rotates) without the flow of pumping medium through the pumping chamber 40. This means defined temperature conditions can be created in the area 54 surrounding the temperature sensor 42 or 46. The temperature control member 64 then functions as a temperature control device 52.

Figure 3:
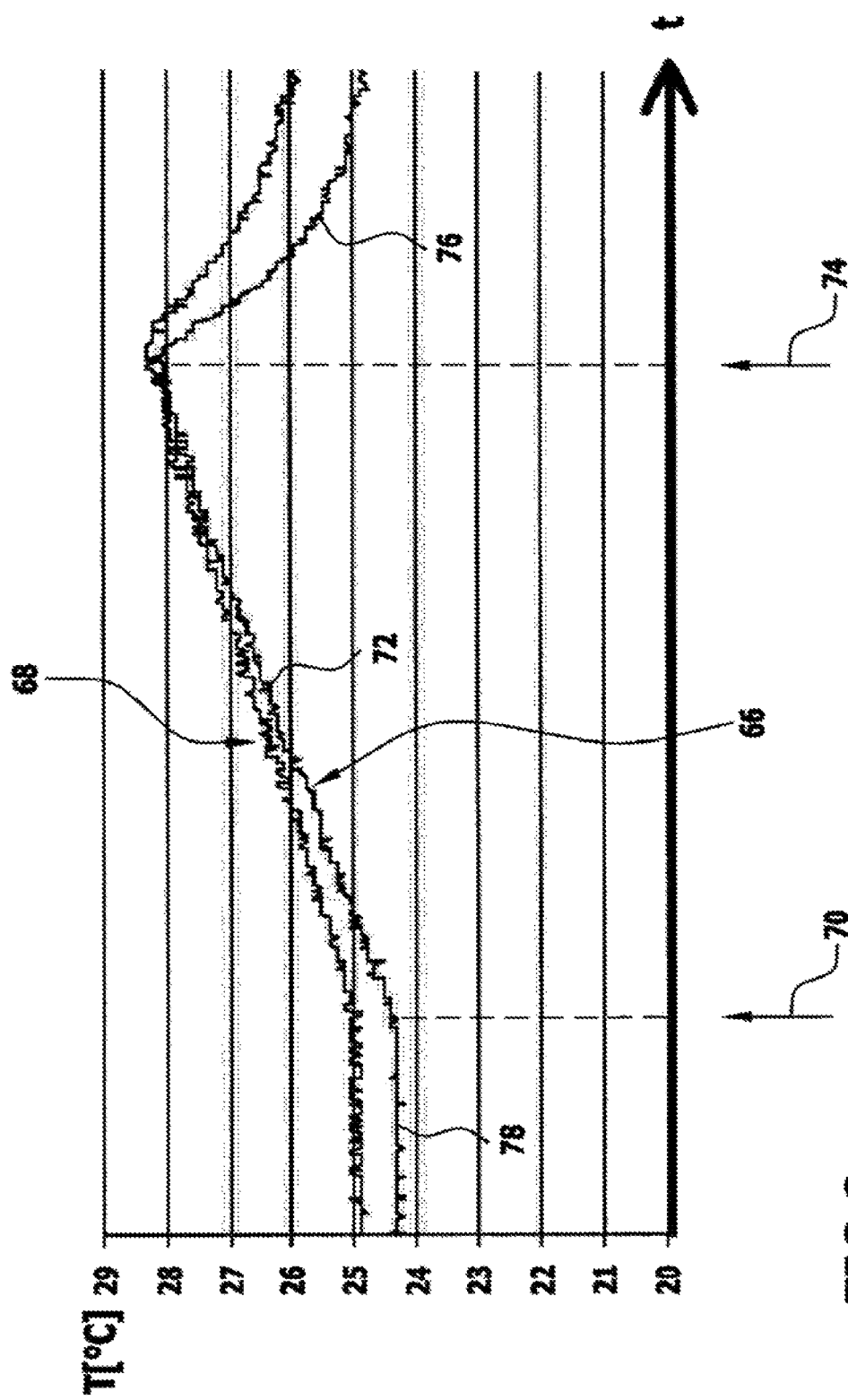
FIG. 3 shows temperature signals in different arrangements of a temperature sensor in the feed pump according to FIG. 2 as they develop over time in different positions of a valve, wherein the feed pump is deactivated.

FIG. 3 shows a diagram of temperature values over time, wherein the curve 66 corresponds to temperature values which are determined using the temperature sensor 42 and the curve 68 corresponds to temperature values which are determined using the temperature sensor 46.

The feed pump 16 was activated, in other words operating, for the corresponding measurement.

The valve 14 was closed at a point in time 70.

The closed valve 14 means no further pumping medium (in particular water) can flow through the line 12. The water can also no longer flow through the pumping chamber 40. Since the feed pump 16 is activated, the rotor 24, and therefore the impeller 36, rotates in the pumping chamber 40. The electrical power is converted to heat, leading to a heating up of the pumping medium in the pumping chamber 40. The pumping medium no longer flows through the pumping chamber 40, in other words no longer enters through an inlet and leaves through an outlet, but rather it flows within the pumping chamber 40. The impeller 36 rotates, wherein the feed pump 10 recirculates as much pumping medium as can move from the pressure side back to the suction side at maximum pump pressure through a suction nozzle gap without external flow. This leads to an increase in temperature 72 over time. This increase in temperature can be detected by the evaluation device 48.

It has been demonstrated that this temperature increase 72 is at least approximatively linear over time.

The valve is reopened at a point in time 74. Pumping medium is then able to flow through the line 12 and therefore also through the pumping chamber 40. This leads to a reduction in temperature 76 over time. This reduction in temperature 76 over time, which is determined solely by pump parameters and in particular by the thermal mass of the feed pump 16 and the power consumption at zero throughput, can in turn be detected by the evaluation device 48.

The feed pump 16 can to a certain extent determine whether there is a flow in the line 12 or not using "on-board means". The means have a non-mechanical flow monitor.

This in turn can be used to control the feed pump 16 itself.

If for example an increase in temperature 72 over time is detected by the evaluation device 48, there are provisions for this to generated a deactivation signal to deactivate the feed pump 16, in other words to switch off the feed pump 16. This switching off means that the rotor 24 is no longer rotated relative to the stator 22.

The switching off can occur immediately when an increase in temperature 72 is detected over time, or can occur when a certain (upper) temperature threshold is reached. This temperature threshold can in turn be determined directly by the temperature sensor 42 or 46 or the corresponding duration can in particular be calculated using a linear increase in temperature 72 over time as a basis.

Before the point in time 70, FIG. 3 shows a state 78 with an approximatively constant temperature. This state 78 corresponds to a state in which the feed pump 16 is activated, in other words pumping medium is being pumped and flows out of the line 12 when the valve 14 is open. The temperature in the state 78 corresponds to the temperature at which pumping medium is provided by a waterworks.

Figure 4:
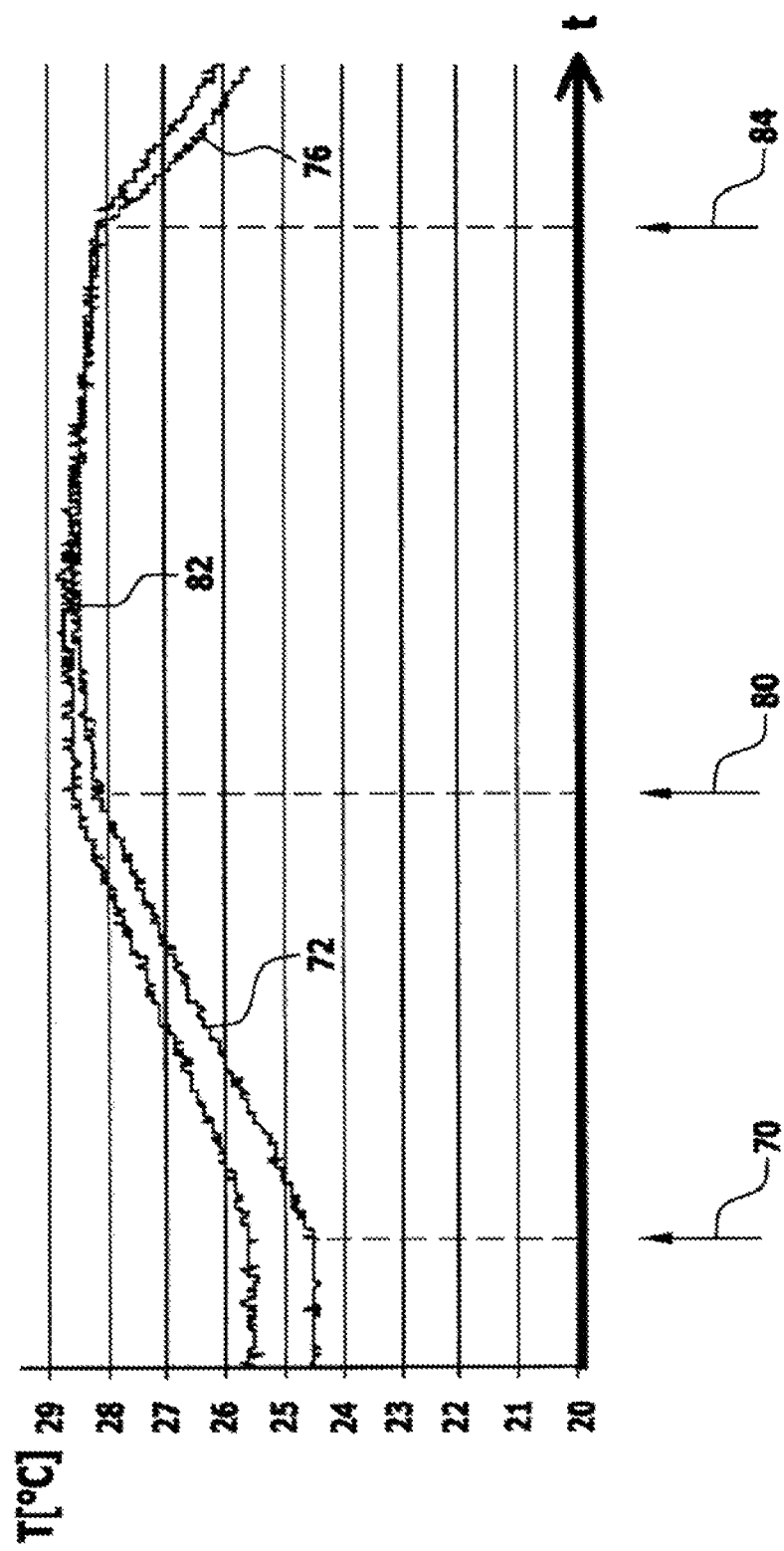
FIG. 4 shows a similar diagram to that shown in FIG. 3 with the valve in various positions and showing activation of the feed pump.

A similar diagram as that in FIG. 3 is shown in FIG. 4. The valve 14 is closed at a point in time corresponding to point in time 70. The increase in temperature 72 over time then occurs.

At a later point in time 80, the feed pump 16 is then deactivated, in other words the impeller 36 no longer rotates in the pumping chamber 40. This results in a slight reduction in temperature 82 over time, which in particular is due to natural convection.

At a later point in time 84, the valve 14 is opened again. A reduction in temperature corresponding to the reduction in temperature 76 then occurs.

As shown in the diagram according to FIG. 3, the curves are due to different positions of the temperature sensor. In the lower curve, the temperature sensor 42 provides its measurement data, in the upper curve it is temperature sensor 46.

As shown in the diagram according to FIG. 4, the evaluation device can detect when a reduction in temperature 76 occurs starting from a status in which the feed pump 16 is deactivated. The reduction in temperature 76 after the point in time 84 is significantly greater than the gradual reduction in temperature 82. The evaluation device 48 can detect when the valve 14 is reopened. The feed pump 16 can detect this using "on-board means".

When it detects a reduction in temperature 76 after a merely gradual reduction in temperature 82, the evaluation device 48 generates an activation signal for the feed pump 16 so this is operated again, in other words to rotate the impeller 36 in the pumping chamber 40.

The feed pump 16 according to the invention functions as follows:

(at least) one temperature sensor 42 or 46 is integrated into the feed pump 16. This temperature sensor 42 or 46 is in particular arranged and designed in combination with the temperature control device 52 such that there are no significant changes in temperature in the area 54 surrounding it which are not due to changes in the temperature of the pumping medium in the pumping chamber 40.

As can be seen in the diagrams according to FIGS. 3 and 4, the development of the temperature signals from the temperature sensor 42 or 46 over time can be used by the evaluation device 48 to detect whether there is low in the pumping chamber 40 (between an inlet and an outlet) and therefore flow in the line 12. The evaluation device 48 can determine whether the valve 14 is closed or open. A flow monitor is provided in this way.

The evaluation device 48 generates a deactivation signal for the feed pump 16 when it determines that the valve 14 is closed, in other words there is no flow in the line 12. This can be detected in particular from an increase in temperature 72 over time, which in particular is at least approximatively linear.

The evaluation device 48 provides the feed pump 16 with an activation signal when it determines that flow in the line 12 is possible while the feed pump 16 is deactivated.

In particular, a reduction in temperature 76 which is more rapid over time than a reduction in temperature 82 that occurs when the feed pump 16 is deactivated can be used by the evaluation device 48 to detect that the valve 14, has been opened and that the feed pump 16 can be activated, in other words pumping medium can once again be transported through the pumping chamber 40 and therefore in the line 12.

The feed pump 16 according to the invention detects whether there is a flow in the line 12 or not. It can to a certain extent switch itself on and off itself without additional mechanical means being required for this.

The feed pump 16 according to the invention can for example provide an increase in pressure on an industrial water system 10 without additional mechanical means being required for this.

LIST OF REFERENCE SIGNS

10 Industrial water system
12 Line
14 Valve
16 Feed pump
18 Heating device
20 Electric motor
22 Stator
24 Rotor
26 Motor housing
28 Motor circuit
30 Circuit housing
32 Bearing shell
34 Bearing body
36 Impeller
38 Rotational axis
40 Pumping chamber
42 Temperature sensor
42' Temperature sensor
44 Wall
46 Temperature sensor
48 Evaluation device
50 Housing
51 Pump housing
52 Temperature control device
54 (Surrounding) area
56 Temperature control chamber
58 Housing
60 Heating element
62 Heat conduction connection
64 Temperature control member
66 Curve
68 Curve
70 Point in time
72 Increase in temperature over time
74 Point in time
76 Reduction in temperature
78 State
80 Point in time
82 Reduction in temperature
84 Point in time

The invention claimed is:

1. A method for operating a feed pump for increasing pressure in a line to which the feed pump is connected, the method comprising:
   providing a feed pump comprising:
      a pumping chamber for a pumping medium,
      at least one temperature sensor for detecting a temperature of pumping medium in the pumping chamber, the at least one temperature sensor arranged in the feed pump, allocated to the pumping chamber, and in thermal contact with the pumping chamber,
      a temperature control device allocated to the at least one temperature sensor and by which defined temperature conditions can be created in an area surrounding the at least one temperature sensor, and
      an evaluation device to which the at least one temperature sensor is coupled to receive temperature signals;
   said method comprising:
      sending, from the at least one temperature sensor, a plurality of temperature signals over time to the evaluation device;
      detecting, with the evaluation device, a temperature trend based on the plurality of temperature signals sent from the at least one temperature sensor; and
      determining, with the evaluation device, an absence of flow in the line during operation of the pump, based on an increasing temperature trend indicative of heating of the pumping medium in the pumping chamber due to a lack of throughflow of the pumping medium.

2. The method of claim 1, further comprising providing a housing in which the pumping chamber is arranged, wherein the at least one temperature sensor is arranged in the housing.

3. The method of claim 1, further comprising driving an impeller of the feed pump with a motor, wherein the at least one temperature sensor is arranged on a housing of the motor.

4. The method of claim 1, further comprising providing the at least one temperature sensor arranged on or proximal to a wall of the pumping chamber.

5. The method of claim 1, wherein the temperature control device is integrated into the at least one temperature sensor.

6. The method of claim 5, wherein the temperature control device is either formed by at least one resistance heating element or comprises at least one heating element.

7. The method of claim 5, wherein the temperature control device is formed by one or more stator coils of a motor of the feed pump or comprises one or more stator coils of the motor, the defined temperature conditions are created by waste heat from the one or more stator coils, and the feed pump further comprises a heat conduction connection between the one or more stator coils and the area surrounding the at least one temperature sensor.

8. The method of claim 5, wherein the temperature control device comprises a temperature control chamber in which the at least one temperature sensor is arranged.

9. The method of claim 1, wherein the evaluation device comprises a temperature control member, the method comprising the temperature control member operating the feed pump without a flow of pumping medium for a specific duration of time in order to create defined temperature conditions in the area surrounding the at least one temperature sensor.

10. The method of claim 1, comprising detecting a presence of flow of the pumping medium from a decreasing temperature trend after a detected phase without flow.

11. The method according to claim 1, further comprising detecting a presence of flow in the line during operation of the pump based upon a decreasing temperature trend measured in the feed pump.

12. The method of claim 11, comprising the evaluation device generating the deactivation signal for operating the feed pump upon detecting the absence of flow.

13. The method of 12, comprising the evaluation device generating the deactivation signal either immediately after detecting the lack absence of flow, or when reaching a specific temperature threshold.

14. The method of claim 11, wherein the evaluation device generates the activation signal for the operation of the feed pump upon detecting the presence flow of the pumping medium after a phase of a lack of flow.

15. The method of claim 11, further comprising the evaluation device generating an activation signal to activate feed pump operation or a deactivation signal to deactivate feed pump operation.

16. The method of claim 1, comprising increasing the pressure in a line of an industrial water system.

17. The method of claim 1, comprising detecting the absence of flow of the pumping medium based upon linearity of the increasing temperature trend.

18. The method of claim 1, comprising determining the absence of flow during operation of the pump due to the lack of throughflow of the pumping medium by detecting a linearity of the increasing temperature trend for a known thermal mass and power consumption of the feed pump.

19. A feed pump for increasing pressure in a line, said feed pump comprising:
   a pumping chamber for a pumping medium,
   at least one temperature sensor configured for detecting a temperature of pumping medium in the pumping chamber, the at least one temperature sensor arranged in the feed pump, allocated to the pumping chamber, and in thermal contact with the pumping chamber,
   a temperature control device which is allocated to the at least one temperature sensor and by which defined temperature conditions can be created in an area surrounding the at least one temperature sensor, and
   an evaluation device to which the at least one temperature sensor is coupled for signal purposes, the evaluation device configured to use increasing temperature trend data from the at least one temperature sensor during operation of the pump to determine the pumping medium is not flowing through the pumping chamber, as indicated by heating of the pumping medium in the pumping chamber due to a lack of throughflow of the pumping medium.

20. The feed pump of claim 19, wherein the evaluation device is further configured to use decreasing temperature trend data from the at least one temperature sensor during operation of the pump to determine the pumping medium is flowing through the pumping chamber.

21. The feed pump according to claim 20, wherein the evaluation device is configured to provide activation signals to activate pump operation and deactivation signals to deactivate pump operation.

* * * * *